United States Patent
Li et al.

(10) Patent No.: US 12,540,272 B2
(45) Date of Patent: Feb. 3, 2026

(54) TREATING FLOWBACK EMULSIONS

(71) Applicant: Halliburton Energy Services, Inc., Houston, TX (US)

(72) Inventors: Chunli Li, Houston, TX (US); Zhiwei Yue, Houston, TX (US); Linping Ke, Houston, TX (US); Antonio Recio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/771,404

(22) Filed: Jul. 12, 2024

(65) Prior Publication Data

US 2026/0015541 A1    Jan. 15, 2026

(51) Int. Cl.
| | |
|---|---|
| *E21B 43/267* | (2006.01) |
| *C09K 8/68* | (2006.01) |
| *C09K 8/70* | (2006.01) |
| *C09K 8/80* | (2006.01) |

(52) U.S. Cl.
CPC ............... *C09K 8/706* (2013.01); *C09K 8/68* (2013.01); *C09K 8/80* (2013.01); *E21B 43/267* (2013.01); *C09K 2208/26* (2013.01); *C09K 2208/28* (2013.01)

(58) Field of Classification Search
CPC . C09K 8/706; C09K 8/68; C09K 8/80; C09K 2208/26; C09K 2208/28; E21B 43/267
See application file for complete search history.

(56) References Cited

U.S. PATENT DOCUMENTS

| | | |
|---|---|---|
| 6,326,335 B1 | 12/2001 | Kowalski et al. |
| 10,995,261 B2 | 5/2021 | Holtsclaw et al. |
| (Continued) | | |

FOREIGN PATENT DOCUMENTS

| | | |
|---|---|---|
| CN | 113803031 A | 12/2021 |
| EP | 1398459 A1 | 3/2004 |
| WO | 2018/111229 | 6/2018 |

OTHER PUBLICATIONS

Devi, et.al, Encapsulation of active ingredients in polysaccharide-protein complex coacervates. Adv. Colloid Interface Sci. 2017, 239, 136.

(Continued)

*Primary Examiner* — Silvana C Runyan
(74) *Attorney, Agent, or Firm* — Thomas Rooney; C. Tumey Law Group PLLC

(57) ABSTRACT

A variety of methods, compositions, apparatuses, and systems are disclosed, including, in one embodiment, a technique of hydraulic fracturing involving providing a fracturing fluid having capsules containing a demulsifier through a wellbore into a subterranean formation and hydraulically fracturing the subterranean formation with the fracturing fluid, wherein the fracturing fluid forms an emulsion in the subterranean formation. The technique includes releasing the demulsifier from the capsules in the subterranean formation, breaking the emulsion in the subterranean formation with the demulsifier released by the capsules, and flowing the fracturing fluid as flowback from the subterranean formation through the wellbore to surface after and/or during the breaking of the emulsion.

16 Claims, 3 Drawing Sheets

(56) References Cited

U.S. PATENT DOCUMENTS

| | | | |
|---|---|---|---|
| 2014/0367100 A1* | 12/2014 | Oliveira | C09K 8/80 166/280.1 |
| 2018/0112126 A1* | 4/2018 | Yang | C09K 8/58 |
| 2020/0181482 A1 | 6/2020 | Eluru et al. | |
| 2021/0189225 A1* | 6/2021 | Sun | C09K 8/72 |
| 2021/0292638 A1* | 9/2021 | Chopade | C09K 8/805 |
| 2021/0371729 A1* | 12/2021 | Li | C09K 8/88 |
| 2023/0357629 A1 | 11/2023 | Gunawan et al. | |

OTHER PUBLICATIONS

International Search Report and Written Opinion for International Patent Application No. PCT/US2025/021842 dated Jul. 11, 2025. PDF file. 9 pages.

\* cited by examiner

TREATING FLOWBACK EMULSIONS

BACKGROUND

For a well, a wellbore may be formed through the surface into a subterranean formation in the crust. In the construction or operation of the well, fluid may be injected from the surface through the wellbore into the subterranean formation. Flowback may be the fluid returning to the surface after being injected into the subterranean formation. The injected fluid and thus the flowback can include hydraulic fracturing fluid.

Hydraulic fracturing is a well-stimulation technique in which rock is fractured by a pressurized liquid that may be a fracturing fluid. Hydraulic fracturing utilizes fluid and material to form fractures in a subterranean formation to stimulate production from wells. The process can involve the pressure injection of fracturing fluid into a wellbore to generate cracks in the deep-rock formations through which natural gas, petroleum, and brine will flow more freely. The fracturing typically generates paths that increase the rate at which production fluids, such as crude oil or natural gas, can be produced from the reservoir formations. The amount of increased production may be related to the amount of fracturing. Proppant may be employed to maintain the fractures as pressure depletes in the well during hydrocarbon production. The proppant may resist formation closure stresses to keep fractures open.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
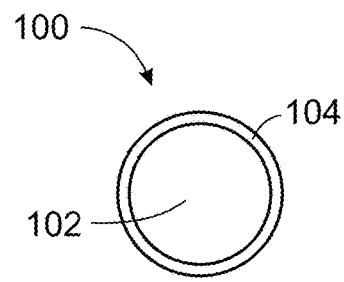
FIG. 1 is a cross section a capsule containing a demulsifier.

Some aspects of the present disclosure are directed to demulsification of fracturing fluid in a subterranean formation for flowback as demulsified to the surface. In other words, hile the fracturing fluid may form an emulsion in the subterranean formation, embodiments herein demulsify the emulsion in the subterranean formation so that the fracturing fluid as flowback that reaches the surface is not emulsified. The fracturing fluid for hydraulic fracturing of the subterranean formation may be more generally labeled as a stimulation fluid.

Embodiments herein address incorporation of capsules (e.g., microcapsules) containing demulsifier into the fracturing fluid injected into the subterranean formation. The demulsifier being in the capsules may provide for delayed application of the demulsifier so not to unduly potentially interfere with application of other components of the fracturing fluid. Further, inclusion of the demulsifier in capsules may facilitate incorporation of oil-based demulsifiers in a water-based fracturing fluid.

The demulsifier in the capsules may include, for example, polygycols, polyglycol esters, ethoxylated alcohols, ethoxylated amines, ethoxylated resins, ethoxylated phenol formaldehyde resins, ethoxylated nonylphenols, polyhydric alcohols, sulfonic acid salts, etc. The demulsifier (emulsion breaker) may be one or more of these chemistry types. The demulsifier (e.g., 102 of FIG. 1) may include these compounds or other demulsifiers. The demulsifier may be a water-soluble demulsifier or an oil-soluble demulsifier.

The fracturing fluid may form an emulsion, for example, with crude oil in the subterranean formation. The immiscible phases of the emulsion can be, for example, water and oil (e.g., crude oil). The delayed application of the demulsifier (via timed release of the demulsifier from the capsules) may provide for the hydraulic fracturing to proceed without application of the demulsifier. Release of the demulsifier from the capsules may be delayed, for example, until the hydraulic fracturing is near or at completion but before the fracturing fluid is returned as flowback to the surface. Thus, the demulsification of the fracturing fluid emulsion occurs without substantially interfering with the hydraulic fracturing. The emulsion can be demulsified downhole before flowback. Therefore, in implementations, treatment at the surface outside of the wellbore to demulsify flowback of emulsified fracturing fluid (which can be costly) may be beneficially avoided. The desired or specified timing (amount) of delay of release may be accommodated in specifying the type and amount of encapsulating agent of the capsule, the strength (e.g., via crosslinking) of the encapsulating agent, and the wall thickness (that is the encapsulating agent) of the capsule.

In implementations, certain components (e.g., friction reducer polymer) in the fracturing fluid may promote formation of the emulsion or stabilize the emulsion, or both. The friction reducer polymer stabilizing the emulsion can be spent or residual friction reducer after the friction reducer acts to reduce friction of the flowing fracturing fluid and after a friction reducer breaker in the fracturing fluid has acted to break down the bulk of the friction reducer polymer chains. Residual friction reducer polymer can remain that can stabilize an emulsion of the fracturing fluid in implementations.

Breakers (e.g., encapsulated sodium bromate, encapsulated sodium persulfate, encapsulated ammonium persulfate, encapsulated perforate, etc.) can be pumped together with friction reducers in the fracturing fluid into subterranean formation. The breaker performance may be controllable based on pumping time and well condition. When the friction reducers complete (finish) their job downhole of reducing friction, the breaker starts to work to break down the friction reducer polymer chains. Again, however, residual friction reducer polymer can remain present.

Embodiments herein add encapsulated demulsifier product into the fracturing fluid package (that may include friction reducer polymers) pumped into the subterranean formation. The release timing of the demulsifiers may be controlled so that the demulsifier product kicks in (acts to resolve the emulsion) after the breaker broke the friction reducer polymer molecules. The delayed function of demulsifier facilitates that there is little or no negative impact of demulsifier molecules on the friction reducer polymers or other components of the fracturing fluid before and/or during the hydraulic fracturing job. When the demulsifier starts to work after the fracturing job, the demulsifier should function in the subterranean formation and the wellbore so that the emulsion will have retention time (residence time) to be broken. Therefore, beneficially in implementations, the emulsion will thus not need to be treated at the surface (at additional costs) to break the emulsion because the flowback (fracturing fluid) emulsion will be generally already broken (no longer an emulsion) when reaching the surface.

Duration of flowback (the flowback period) may be, for example, in the ranges of 2 days to 2 weeks, or 30 days to 120 days, and the like. The flowback fluid may include, for example, fracturing fluid, crude oil, natural gas, water, and sand. In general, flowback may refer to the fluid returned to the surface from the subterranean formation, or to the process of allowing the fluid to return to the surface from the subterranean formation. Flowback may be the process of allowing fluids to flow from the well following a treatment, either in preparation for a subsequent phase of treatment or in preparation for cleanup and returning the well to production. Flowback may be the fluid returning to the surface after being injected into a subterranean formation.

In implementations, the capsule having the demulsifier is a microcapsule that may be a small sphere (or other geometry) having a near-uniform wall (or non-uniform wall) enclosing some material (here, a demulsifier). The enclosed material in the microcapsule may be referred to as the core, internal phase, or fill, whereas the wall is sometimes called a shell, coating, or membrane. In implementations, a surfactant is not included in the capsule in addition to the demulsifier in the capsule. A solvent may be present with the demulsifier in the capsule. In the preparation of the demulsifier and the capsule, the solvent may be utilized to dissolve or disperse the demulsifier.

The immiscible phases of the emulsions are typically water and oil. Most produced fluids from the subterranean formation are water in oil (water droplets dispersed in oil continuous phase), which can be called regular emulsion. In some cases, such as with steam assisted gravity drainage (SAGD), reverse emulsions (oil in water) or complex emulsions (water in oil in water, or oil in water in oil) are produced. The emulsion in the produced fluids could be stabilized by different agents, such as naturally existing surfactants (resins, paraffin, or asphaltene), iron sulfide (FeS), or other solid particles, etc. The polymer residues in the fracturing fluids can serve as surfactants and stabilize the emulsions. The fracturing fluid emulsion can be demulsified before flowback via the demulsifier released from the capsules. The fracturing fluid emulsion can be demulsified during flowback but before the fracturing fluid reaches the surface.

FIG. 1 is a cross section of a capsule 100 containing a demulsifier 102 and in which the capsule 100 can be included in a fracturing fluid. An encapsulating agent forms the wall 104 of the capsule 100. The wall 104 has a wall thickness. The demulsifier 102 is situated in an interior volume (space) of the capsule 100. The interior volume having the demulsifier 102 is surrounded by the wall 104 (encapsulation agent) such that the capsule 100 contains the demulsifier 102. In the illustrated example, the capsule 100 is generally spherical. However, other geometries are applicable. The capsule 100 may be a microcapsule having a particle size (e.g., diameter), for instance, in the ranges of 1 micron (μm) to 100 μm, 50 nanometers (nm) to 2 millimeters (mm), or 20 μm to 200 μm. The capsules 100 added to the fracturing fluid can include nanocapsules having a particle size, for example, in the ranges 5 nm to 1000 nm, 10 nm to 1000 nm, or 100 nm to 500 nm.

The amount of delay of the release of the demulsifier 102 from the capsule 100 may be example, the time length (duration) of most or all of the hydraulic fracturing job, such as a number of days, e.g., 2 days to 2 weeks. The capsule 100 may be configured with the desired or specified delay (time length to release the demulsifier 102), for example, by the thickness of the wall 104, the strength (e.g., via crosslinking) of the wall 104 material (encapsulation agent), the type of the encapsulation agent forming the wall 104, and so forth.

The encapsulation agent (coating) forming the wall 104 may be, for example, ethyl cellulose, polyvinyl alcohol, gelatin, sodium alginate, and so forth. The encapsulation agent forming the wall 104 may be, for example, hydrophilic colloid material (hydrophilic colloids), such as gelatin, albumen, alginate (e.g., sodium alginate), casein, agaragar, starch, pectins, carboxymethyl cellulose, Irish moss, Arabic gum, etc. Other encapsulation agents (wall 104 materials) are applicable.

In implementations, to encapsulate the demulsifier 102 with the encapsulating agent (wall 104 material), the demulsifier 102 may be dispersed in a solvent (e.g., water-immiscible solvent), and then emulsified with an aqueous solution containing one or more macro colloids capable of undergoing simple or complex coacervation. In implementations of coacervation, macro colloids deposit around the dispersed droplets of the solvent and demulsifier 102. The droplets are thereby encapsulated (e.g., completely encapsulated) and sealed. Other implementations of encapsulation are applicable. For instance, the capsules 100 as microcapsules (e.g., solids microcapsules) can be manufactured by spray drying or freeze drying techniques.

Coacervation can be defined as the separation of a macromolecular solution into two immiscible liquid phases: a dense coacervate phase and a dilute equilibrium one. In some examples, coacervation may involve coacervation-phase separation under agitation (e.g., continuous agitation) giving the actions of [1] formation of immiscible chemical phases (e.g., liquid manufacturing vehicle phase, core material phase, and coating material phase), [2] deposition of coating in which core material is dispersed in the coating (e.g., polymer) solution, and the coating (e.g., polymer) material is coated around core (e.g., deposition of liquid coating around core by polymer adsorbed at the interface formed between core material and vehicle phase), and [3] rigidizing of coating in which coating material is immiscible in vehicle phase and is made rigid, such as by thermal, cross-linking, or dissolution techniques.

Figure 2:
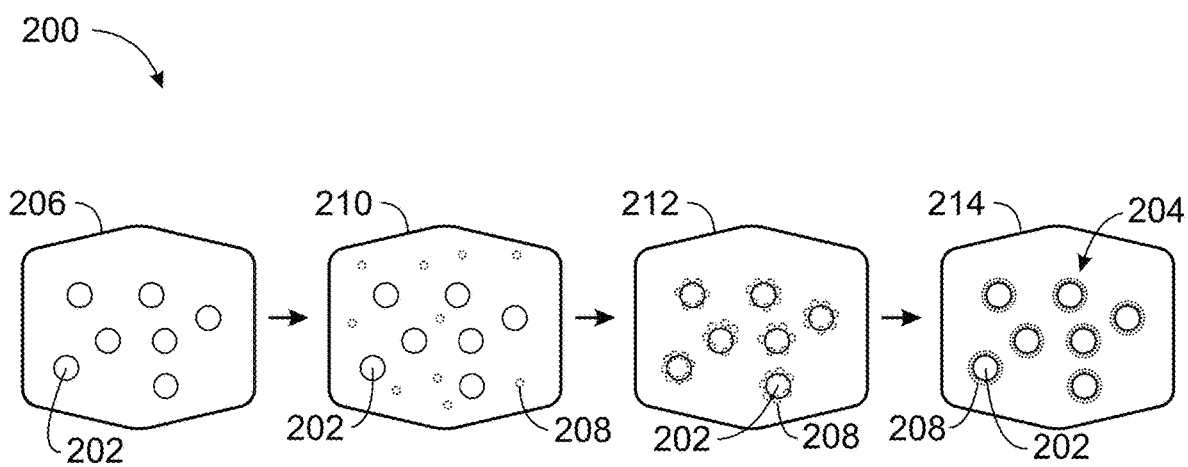
FIG. 2 is a diagram of an example of a coacervation scheme for encapsulating a demulsifier for inclusion in a fracturing fluid.

FIG. 2 is an example of a coacervation scheme 200 for encapsulating a demulsifier 200 for inclusion in a fracturing fluid. The mechanisms of capsules 204 (e.g., microcapsules) formation in the coacervation technique may involve [a] placing the demulsifier 202 in a liquid phase, as indicated by reference numeral 206, [b] suspending the core material including the demulsifier 202 in the liquid phase along with an encapsulation agent 208, as indicated by reference numeral 210, [c] deposition of the encapsulation agent 208 (e.g., as liquid polymer) around the core, as indicated by reference numeral 212, and [d] gelling (e.g., including crosslinking) and solidification of the encapsulation agent 208 as the capsule 204 wall to give the capsule 204, as indicated by reference numeral 214.

Figure 3:
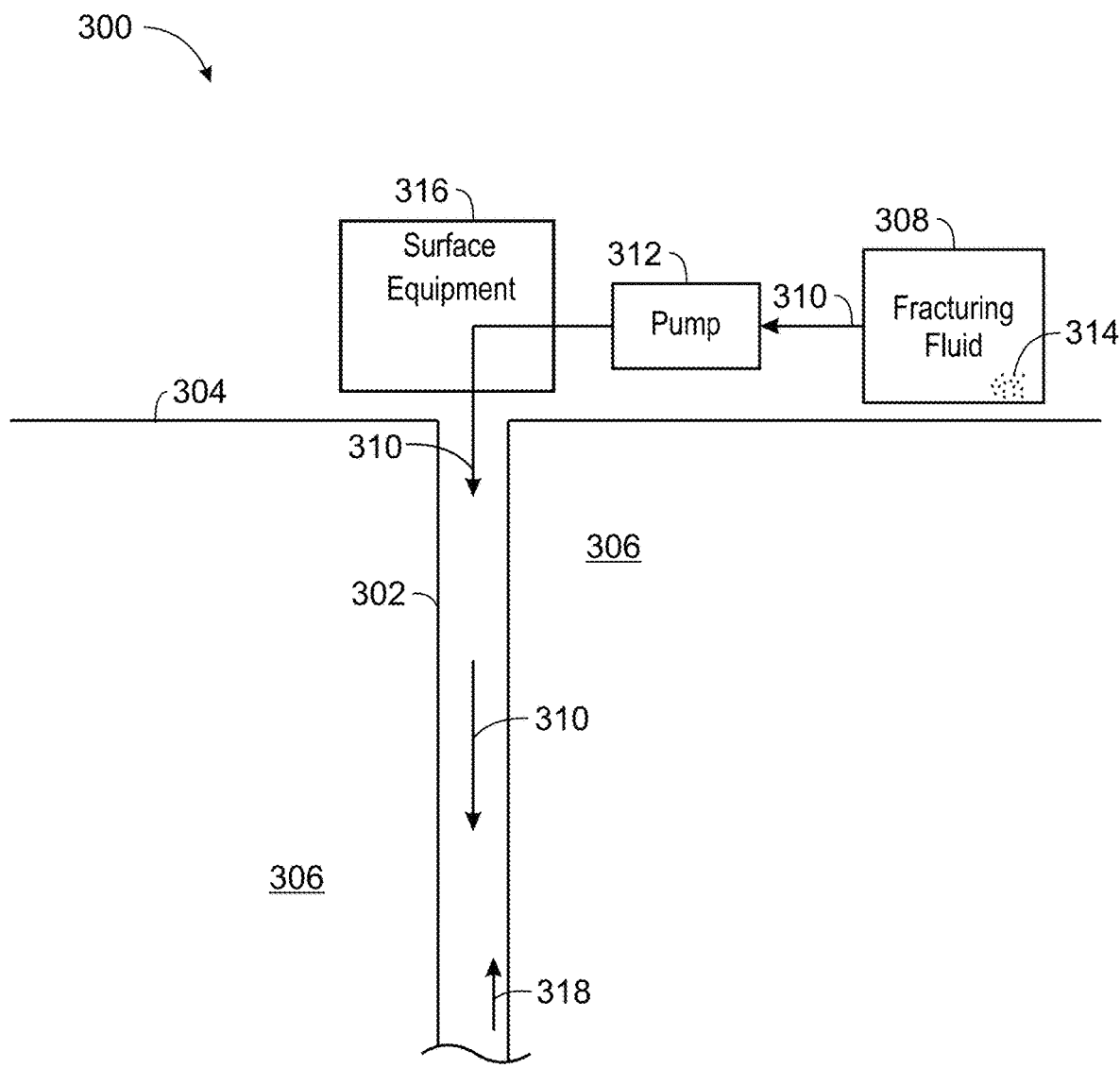
FIG. 3 is a diagram of well site having a wellbore formed through the surface into a subterranean formation in the crust.

FIG. 3 is a well site 300 having a wellbore 302 formed through the surface 304 into a subterranean formation 306 in the crust. The subterranean formation 306 may be labeled as a geological formation, a rock formation having hydrocarbon, a hydrocarbon formation, a formation reservoir, a hydrocarbon reservoir, a natural gas reservoir, a reservoir, and the like. The subterranean formation 306 may be an unconventional formation to be subjected to hydraulic fracturing.

The wellbore 302 can be vertical, horizontal, and/or deviated. The wellbore 302 can be openhole but is generally a cased wellbore. The annulus between the casing and the formation 306 may be cemented. Perforations (not shown) may be formed through the casing and cement into the formation 306. The perforations may allow both for flow of fracturing fluid into the subterranean formation 306 and for flow of flowback and produced hydrocarbon from the subterranean formation 306 into the wellbore 302.

The well site 300 may have a hydraulic fracturing system including a source 308 of fracturing fluid 310 at the surface 304 near or adjacent the wellbore 302. The source 308 may include one or more vessels holding the fracturing fluid 310. In particular, the fracturing fluid 310 may be stored, for example, in vessels or containers on ground, on a vehicle (for instance, truck or trailer), or skid-mounted. The fracturing fluid 310 may be a water-based fracturing fluid. In some implementations, the fracturing fluid 310 is slickwater that may be primarily water (for example, at least 98.5% water by volume). The fracturing fluid 310 can be polymer-based or gel-based fluids. The fracturing fluid can be a surfactant-based fluid [e.g., viscoelastic surfactant (VES)-based fluid]. The fracturing fluid 310 can include polymers and surfactants. Additives to the fracturing fluid 310 may include a friction reducer, surfactant(s), breaker (viscosity breaker, friction reducer breaker, etc.), foaming agent, temperature stabilizer, crosslinker, acid, scale inhibitor, biocide, and so forth. Fracturing fluids 310 of differing viscosity may be employed in the hydraulic fracturing. The fracturing fluid 310 may include proppant. In operation, the fracturing fluid 310 is provided to (introduce into) the wellbore 302. The fracturing fluid 310 may be injected (pumped) into the wellbore 302.

The hydraulic fracturing system at the well site 300 may include motive devices such as one or more pumps 312 to pump (inject) the fracturing fluid 310 through the wellbore 302 into the subterranean formation 306. The pumps 312 may be, for example, positive displacement pumps and arranged in series and/or parallel. Again, the wellbore 302 may be a cemented cased wellbore and have perforations for the fracturing fluid 310 to flow (e.g., via motive force of the pumps 312) into the formation 306. In some implementations, the speed of the pumps 312 may be controlled to give the desired or specified flow rate of the fracturing fluid 310. In lieu of (or in addition to) relying on the speed of the pump, the system may include a control valve(s) to modulate or maintain the flow of fracturing fluid 310 into the wellbore 302 for the hydraulic fracturing. The set point of the desired or specified flow rate may be manually set or driven by a control system. The flow rate of the fracturing fluid 310 may include a clean rate that is flow rate of fracturing fluid 310 without proppant. The flow rate of the fracturing fluid 310 may include a slurry rate that may be a flow rate of the fracturing fluid 310 (e.g., a thicker or more viscous fracturing fluid) as a slurry having proppant, and the like.

The fracturing fluid 310 may be prepared (formulated and mixed) offsite prior to disposition of the fracturing fluid 310 into the source 308 (e.g., vessel(s)) at the well site 300. Alternatively, a portion (some components) of the fracturing fluid 310 may be mixed offsite and disposed into the source 308 vessel and the remaining portion (remaining components) of the fracturing fluid 310 added to the source 308 vessel or to a surface conduit conveying the fracturing fluid 310. In other implementations, the fracturing fluid 310 may be prepared onsite with components added to (and batch mixed in) the source 308 vessel.

The fracturing fluid 310 may include capsules 314 encapsulating a demulsifier. The percentage of the fracturing fluid 310 that is the capsules 314 may be, for example, in the range of 0.001% to 1%, by weight or volume. For the fracturing fluid 310 including capsules 314 containing demulsifier, the fracturing fluid 310 in the source 308 vessel may have all components of the fracturing fluid 310. In certain embodiments, some components of the fracturing fluid 310 may be added to the source 308 vessel near or at the time (or during) the pumping of the fracturing fluid 310 into the wellbore 302 for the hydraulic fracturing. However, in other embodiments, not all components of the fracturing fluid 310 are included in the source 308 vessel. Instead, at least one component (e.g., capsules 314, etc.) of the fracturing fluid 310 may be added to a conduit conveying the fracturing fluid 310. The component may be added to a suction conduit of the pump 312 or a discharge conduit of the pump 312, or both, as the fracturing fluid 310 is being pumped into the wellbore 302. Such can be characterized as on-the-fly addition of the component.

The capsules 314 containing demulsifier may be added to the fracturing fluid 310 before disposition of the fracturing fluid 310 into the source 308 vessel. The capsules 314 containing demulsifier may be added to the source 304 vessel to add the capsules 314 to the fracturing fluid 310 in the source 308 vessel. As indicated, the capsules 314 may be added to a surface conduit conveying the fracturing fluid 310 as the pump 312 is providing the fracturing fluid 310 into the wellbore 302. The capsules 114 containing demulsifier may be added to the pump 312 suction conduit conveying the fracturing fluid from the source 308 to the pump 312. The capsules 114 containing demulsifier may be added to the pump 312 discharge conduit conveying the fracturing fluid 310 from the pump 312 to the wellbore 302. However, again, in implementations, the capsules 114 may be incorporated in the formulation (e.g., initial formulation) of the fracturing fluid 310 prior to pumping the fracturing fluid 310 into the wellbore 302.

The hydraulic fracturing system at the well site 300 may have a source of proppant, which can include railcars, hoppers, containers, or bins having the proppant. Proppant may be segregated by type or mesh size (particle size). The proppant can be, for example, sand or ceramic proppants. The source of proppant may be at the surface 304 near or adjacent the wellbore 302. The proppant may be added to the fracturing fluid 310 such that the fracturing fluid 310 includes the proppant. In some implementations, the proppant may be added (for example, via gravity) to a conduit conveying the frac fluid 310, such as at a suction of a fracturing fluid pump 312. A feeder or blender may receive proppant from the proppant source and discharge the proppant into pump 312 suction conduit conveying the fracturing fluid 310.

The fracturing fluid 310 may be a slurry having the solid proppant. The pump 312 discharge flow rates (frac rates) may include a slurry rate which may be a flow rate of the fracturing fluid 310 as slurry having proppant. The pump 312 discharge flow rates (frac rates) may include a clean rate which is a flow rate of fracturing fluid 310 without proppant. In particular implementations, the fracturing system parameters adjusted may include at least pump(s) 312 rate, proppant concentration in the frac fluid 310, capsules 314 addition rate, and capsules 314 amount or concentration in the fracturing fluid 310. Fracturing operations can be manual or guided with controllers.

The fracturing fluid 310 may be a relatively viscous fracturing fluid, e.g., to promote conveying of proppant in the fracturing fluid. Alternatively, the fracturing fluid 310 may be, for example, slickwater fracturing fluid, or fracturing fluid that is not viscous, and in which pump rate of the fracturing fluid can be increased to facilitate conveying of proppant into the fractures. In implementations, the fracturing fluid 310 is predominantly (primarily) water. In implementations, the fracturing fluid (e.g., a wet basis or not counting proppant) may be, for example, at least 90 volume percent (vol %) of water or at least 90 weight percent (wt %) of water. The fracturing fluid 310 may include polymer, crosslinkers, guar (e.g., hydroxypropyl guar or carboxymethyl guar), polymer stabilizers, gel stabilizers, gel breaker, surfactants, clay stabilizers, corrosion inhibitors, scavengers (e.g., oxygen scavenger), friction reducers (e.g., polymer and/or surfactant), foaming compounds, and so forth. The fracturing fluid 310 may include viscosifiers (e.g., as polymers, surfactants, etc.) that increase viscosity of the fracturing fluid. The fracturing fluid may include a viscosity breaker.

The fracturing fluid 310 may include a surfactant to reduce friction of flow of the fracturing fluid. Surfactant(s) may also act to promote generation and/or stabilization of foam if present. In implementations, as indicated, the fracturing fluid 310 may include a viscoelastic surfactant (VES), e.g., utilized to increase viscosity rather than reduce friction of flow.

The gel stabilizer (if utilized) can include alkaline metal oxides, alkaline metal hydroxides, alkaline earth metal oxides, alkaline earth metal hydroxides, transition metal oxides, transition metal hydroxides, glycols, or polyols, or any combinations thereof. The gel stabilizer can be an organic gel stabilizer. In function, the gel stabilizer can be a viscosity stabilizer that stabilizes viscosity of the fracturing fluid 310. The presence of the gel stabilizer in the fracturing fluid 310 may reduce the rate of viscosity loss of the fracturing fluid 310 during the treatment, which can result in more efficient proppant transport in implementations. The crosslinker (if utilized) may include an organic crosslinker or an inorganic crosslinker for crosslinking polymer in the fracturing fluid 310. If present, the foaming compound (e.g., foamer, foaming agent, foam stabilizer, etc.) may promote formation of the foam or stability of the foam, or a combination thereof. A foaming compound may be a material (e.g., surfactant) that facilitates the formation (and sometimes stability) of foam. When present (e.g., in relatively small amounts) the foaming compound may be a foaming agent that reduces surface tension of a liquid (reduces the work needed to create the foam) and/or be a foam stabilizer that may increase the foam colloidal stability by inhibiting coalescence of bubbles. The foaming compound (foaming, agent, foamer, or foam stablizer) may be a surfactant, such as a betaine (for example, hydroxysulfobetaine) or a hydroxysultaine (for example, cocamidopropyl hydroxysultaine). A foaming compound that advances foam may be a foaming agent and/or a foam stabilizer. The fracturing fluid 310 may include other components and additives.

In addition to the hydraulic fracturing system, the well site 300 may include additional surface equipment 316. The surface equipment 316 may support the hydraulic fracturing system. The surface equipment 316 may provide for general operations at the well site 300. The surface equipment 316 may include a wellhead to support the production of fluid from the subterranean formation 306. A wellhead may be a component or structure at the surface 304 coupled to (or in communication with) the wellbore 302 and that provides the structural and pressure-containing interface for drilling and production equipment. The wellhead generally includes conduits (piping, tubing, etc.) and valves for receiving, routing, and discharge of fluid (e.g., hydrocarbon, water, flowback, etc.) produced from the formation 306.

After performing the hydraulic fracturing, the fracturing fluid 310 downhole may be allowed to return (as flowback 318) from the formation 306 through the wellbore 302 to the surface 304. Motive force for the flowback 318 can be the pressure of the subterranean formation 306, such as wellbore 302 bottomhole pressure or wellbore 302 pressure at an intermediate position, such as at depth of a top portion of the perforations. Motive force for the flowback 318 can also be by nitrogen lifting, an electrical submersible pump, and so forth. Again, motive force for the flowback 318 can be wellbore 302 pressure.

In general, flowback may refer to the fluid returned to the surface 304 from the subterranean formation 306, or to the process of allowing the fluid to return to the surface 304 from the subterranean formation 306. Flowback may be the process of allowing fluids to flow from the well following a treatment, either in preparation for a subsequent phase of treatment or in preparation for cleanup and returning the well to production. Flowback may be the fluid returning to the surface 304 after being injected into a subterranean formation 306.

Here, the flowback of the fracturing fluid 310 may discharge from the wellbore 302 through the wellhead, such as through a production valve of the wellhead. In implementations, the flowback may be routed through the production valve into a sales line. The routing of the flowback flow from the wellbore 302 may via an automated production valve (and manual valves) on the wellhead. The fracturing fluid 310 returned to the surface 304 may be labeled as flowback 318.

The well site 300 may include a control system that supports or is a component of the hydraulic fracturing system. The control system includes a hardware processor and memory storing code (logic, instructions) executed by the processor to perform calculations and direct operations at the well site 300. The processor may be one or more processors and each processor may have one or more cores. The hardware processor(s) may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system may include a desktop computer, laptop computer, computer server, programmable logic controller (PLC), distributed computing system (DSC), controllers, actuators, control cards, an instrument or analyzer, and a user interface. In operation, the control system may facilitate processes at the well site 300 and including to direct operation of aspects of the hydraulic fracturing system.

The control system may be communicatively coupled to a remote computing system that performs calculations and provides direction. The control system may receive user input or remote-computer input that specifies the set points of control devices in the hydraulic fracturing system. The control system may specify the set point of a control device for component addition to fracturing fluid 310. In some implementations, the control system may calculate or otherwise determine the set point of a control device. The determination may be based at least in part on the operating conditions of the hydraulic fracturing and on information (or feedback) regarding wellbore operation.

Figure 4:
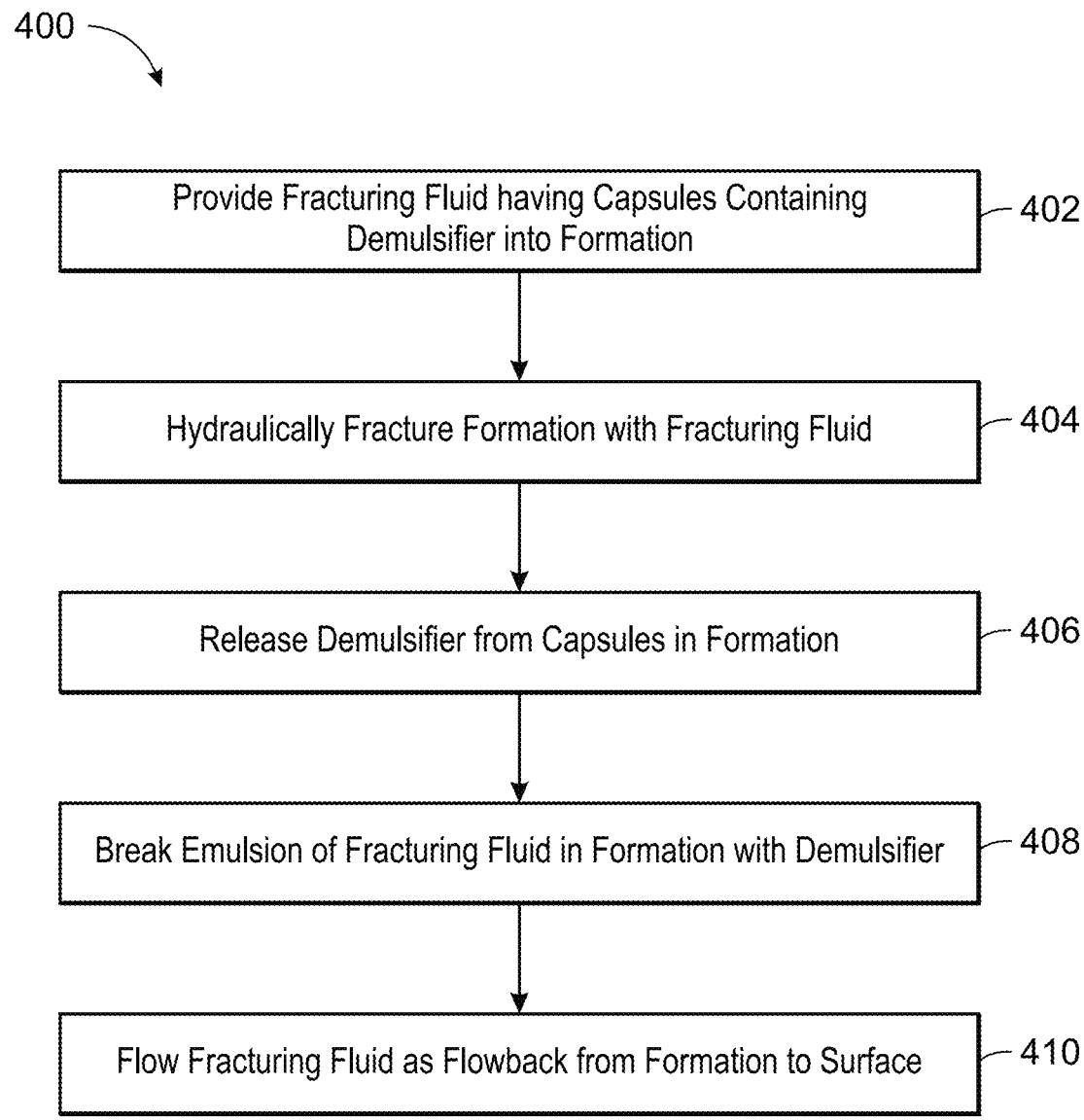
FIG. 4 is a block flow diagram of a method of hydraulic fracturing (and flowback).

FIG. 4 is a method 400 of hydraulic fracturing (and flowback). At block 402, the method includes providing (e.g., flowing, injecting, pumping, etc.) a fracturing fluid having capsules (e.g., microcapsules) containing a demulsifier through a wellbore into a subterranean formation. The providing of the fracturing fluid may involve pumping the fracturing fluid having the capsules through the wellbore into the subterranean formation.

At block 404, the method includes hydraulically fracturing the subterranean formation with the fracturing fluid (stimulation fluid), wherein the fracturing fluid forms an emulsion in the subterranean formation. The emulsion includes immiscible phases, such as water in oil, or oil in water. An emulsion is water (O/W) is composed of an oil phase dispersed in an aqueous phase (e.g., known as a direct emulsion). Emulsion water in oil (W/O) is composed of an aqueous phase dispersed in the oil phase.

In implementations, the fracturing fluid includes a friction reducer (e.g., polymer) that stabilizes the emulsion in the subterranean formation before the breaking (block 408) of the emulsion with the demulsifier. In implementations, the friction reducer may be involved in the forming of the emulsion. In other words, the fracturing fluid may form the emulsion in the subterranean formation at least in part via the friction reducer.

At block 406, the method includes releasing the demulsifier from the capsules in the subterranean formation. In implementations, the capsules release the demulsifier after the friction reducer has reduced friction of the flowing of the fracturing fluid through the wellbore into the subterranean formation. In implementations, the fracturing fluid can include a friction reducer breaker that breaks polymer chains (polymer molecules) of the friction reducer. In implementations, the capsules release the demulsifier after the friction reducer breaker has acted to break the friction reducer.

At block 408, the method includes breaking the emulsion in the subterranean formation with the demulsifier released by the capsules. A demulsifier may be a chemical utilized to break (separate) emulsions, that is, to separate the phases (e.g., the two immiscible phases). The type of demulsifier selected may depend on the type of emulsion, e.g., either oil-in-water or water-in-oil. The breaking of the emulsion with the demulsifier may occur in the subterranean formation. The breaking of the emulsion with the demulsifier may occur in the wellbore as the fracturing fluid flows as flowback through the wellbore to the surface. Demulsifiers, also known as emulsion breakers, act to break (destabilize) both oil-in-water and water-in-oil type emulsions. The breaking of the emulsion via the demulsifier can be to separate the emulsified immiscible phases.

At block 410, the method includes flowing the fracturing fluid as flowback from the subterranean formation through the wellbore to surface (after breaking the emulsion). In implementations, the flowback that reaches the surface from the subterranean formation through the wellbore is not emulsified (not an emulsion). In implementations, the capsules release the demulsifier after the hydraulically fracturing of the subterranean formation with the fracturing fluid is complete. The fracturing fluid may include proppant for at least a portion of the providing of the fracturing fluid through the wellbore into the subterranean formation.

An embodiment is a method of hydraulic fracturing and flowback. The method includes flowing a fracturing fluid from surface through a wellbore into a subterranean formation. The flowing of the fracturing fluid typically involves pumping the fracturing through the wellbore into the subterranean formation. The fracturing fluid includes a friction reducer (e.g., polymer) and capsules encapsulating a demulsifier. The capsules may be or include microcapsules encapsulating the demulsifier. The method involves hydraulically fracturing the subterranean formation with the fracturing fluid (stimulation fluid) to form fractures in the subterranean formation, e.g., thereby generating fractures in the formation. The fracturing fluid forms an emulsion in the subterranean formation. The method includes breaking the emulsion of the fracturing fluid in the subterranean formation with the demulsifier as released by the capsules, and after breaking the emulsion, flowing the fracturing fluid as flowback from the subterranean formation through the wellbore to the surface. The breaking of the emulsion may occur in the wellbore as the fracturing fluid is flowing through the wellbore as flowback to the surface. In implementations, the friction reducer stabilizes the emulsion in the subterranean formation before the demulsifier breaks the emulsion. In implementations, the capsules release the demulsifier after the friction reducer has reduced friction of the flowing of the fracturing fluid through the wellbore into the subterranean formation. In implementations, the capsules release the demulsifier after the hydraulically fracturing of the subterranean formation with the fracturing fluid is complete. In implementations, the flowback including the fracturing fluid that reaches the surface from the wellbore is not an emulsion. As indicated, the breaking of the emulsion with the demulsifier may occur in the subterranean formation. Again, the breaking of the emulsion with the demulsifier may occur in the wellbore during the flowing of the fracturing fluid as flowback from the subterranean formation through the wellbore to the surface.

An embodiment is a fracturing fluid for hydraulically fracturing a subterranean formation. The fracturing fluid includes a friction reducer that includes polymer. The fracturing fluid includes capsules (e.g., microcapsules) containing a demulsifier for breaking an emulsion of the fracturing fluid formed during the hydraulically fracturing of the subterranean formation. In implementations, the friction reducer (e.g., residual friction reducer including polymer chains) stabilizes the emulsion. In implementations, the capsules are configured to release the demulsifier after the friction reducer has acted to reduce friction of flowing of fracturing fluid during the hydraulic fracturing. In implementations, the capsules are configured to release the demulsifier after the hydraulically fracturing of the subterranean formation is complete. In implementations, the fracturing fluid includes a friction reducer breaker configured to break polymer molecules of the friction breaker.

In view of the foregoing, the present disclosure may provide for breaking of a fracturing fluid emulsion downhole and for flowback of the fracturing fluid being demulsified as reaching the surface. The methods, systems, and compositions may include any of the various features disclosed herein, including one or more of the following statements.

Statement 1. A method of hydraulic fracturing, comprising: providing a fracturing fluid comprising capsules containing a demulsifier through a wellbore into a subterranean formation; hydraulically fracturing the subterranean formation with the fracturing fluid, wherein the fracturing fluid forms an emulsion in the subterranean formation; releasing the demulsifier from the capsules in the subterranean formation; breaking the emulsion in the subterranean formation with the demulsifier released by the capsules; and flowing the fracturing fluid as flowback from the subterranean formation through the wellbore to surface after breaking the emulsion.

Statement 2. The method of Statement 1, wherein the flowback as reaching the surface from the subterranean formation through the wellbore is not emulsified.

Statement 3. The method of Statement 1 or 2, wherein flowing the fracturing fluid as flowback comprises flowing the fracturing fluid as flowback from the subterranean formation through the wellbore to the surface during the breaking of the emulsion.

Statement 4. The method of any preceding Statement, wherein the breaking of the emulsion comprises breaking the emulsion in the wellbore with the demulsifier released by the capsules Statement 5. The method of any preceding Statement, wherein the breaking of the emulsion with the demulsifier occurs in the subterranean formation, and wherein the breaking of the emulsion with the demulsifier occurs in the wellbore as the fracturing fluid flows as flowback through the wellbore to the surface.

Statement 6. The method of any preceding Statement, wherein the providing the fracturing fluid comprises pumping the fracturing fluid through the wellbore into the subterranean formation, and wherein the capsules comprise microcapsules.

Statement 7. The method of any preceding Statement, wherein the fracturing fluid comprises a friction reducer that stabilizes the emulsion in the subterranean formation before the breaking of the emulsion with the demulsifier, and wherein the friction reducer comprises a polymer.

Statement 8. The method of any preceding Statement, wherein the fracturing fluid comprises a friction reducer breaker that breaks polymer chains of the friction reducer, and wherein the fracturing fluid comprises proppant for at least a portion of the providing of the fracturing fluid through the wellbore into the subterranean formation.

Statement 9. The method of any preceding Statement, wherein providing the fracturing fluid comprises flowing the fracturing fluid through the wellbore into the subterranean formation, and wherein the capsules release the demulsifier after the friction reducer has reduced friction of the flowing of the fracturing fluid through the wellbore into the subterranean formation.

Statement 10. The method of any preceding Statement, wherein the capsules release the demulsifier after the hydraulically fracturing of the subterranean formation with the fracturing fluid is complete.

Statement 11. A method of hydraulic fracturing, comprising: providing a fracturing fluid from surface through a wellbore into a subterranean formation, wherein the fracturing fluid comprises a friction reducer and capsules encapsulating a demulsifier; hydraulically fracturing the subterranean formation with the fracturing fluid, thereby generating fractures in the subterranean formation, wherein the fracturing fluid forms an emulsion in the subterranean formation; breaking the emulsion in the subterranean formation with the demulsifier as released by the capsules; and flowing the fracturing fluid as flowback from the subterranean formation through the wellbore to the surface after breaking the emulsion.

Statement 12. The method of Statement 11, wherein the capsules comprise microcapsules encapsulating the demulsifier.

Statement 13. The method of Statement 11 or 12, wherein the capsules release the demulsifier after the friction reducer has reduced friction of the providing comprising the flowing of the fracturing fluid through the wellbore into the subterranean formation.

Statement 14. The method of Statement 11 to 13, wherein the capsules release the demulsifier after the hydraulically fracturing of the subterranean formation with the fracturing fluid is complete.

Statement 15. The method of Statement 11 to 14, wherein the providing the fracturing fluid comprises pumping the fracturing fluid through the wellbore into the subterranean formation, and wherein the friction reducer comprises polymer.

Statement 16. The method of Statement 11 to 15, wherein the friction reducer stabilizes the emulsion in the subterranean formation before the demulsifier breaks the emulsion.

Statement 17. The method of Statement 11 to 16, wherein the flowback comprising the fracturing fluid as reaching the surface from the wellbore is not the emulsion.

Statement 18. The method of Statement 11 to 17, wherein the breaking of the emulsion with the demulsifier occurs in the subterranean formation, and wherein the breaking of the emulsion with the demulsifier occurs in the wellbore during the flowing the fracturing fluid as flowback from the subterranean formation through the wellbore to the surface.

Statement 19. A fracturing fluid for hydraulically fracturing a subterranean formation, comprising: a friction reducer comprising polymer; and capsules containing a demulsifier for breaking an emulsion of the fracturing fluid formed during the hydraulically fracturing of the subterranean formation.

Statement 20. The fracturing fluid of Statement 19, wherein the capsules comprise microcapsules.

Statement 21. The fracturing fluid of Statement 19 or 20, wherein the capsules are configured to release the demulsifier after the friction reducer has acted to reduce friction of flowing of fracturing fluid during the hydraulic fracturing.

Statement 22. The fracturing fluid of Statement 19 to 21, wherein the capsules are configured to release the demulsifier after the hydraulically fracturing of the subterranean formation is complete.

Statement 23. The fracturing fluid of Statement 19 to 22, wherein the friction reducer stabilizes the emulsion.

Statement 24. The fracturing fluid of Statement 19 to 23, comprising a friction reducer breaker configured to break polymer molecules of the friction reducer.

The present embodiments are well adapted to attain the ends and advantages mentioned as well as those that are inherent therein. The particular embodiments disclosed are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of hydraulic fracturing, comprising:
   providing a fracturing fluid comprising a friction reducer and capsules containing a demulsifier through a wellbore into a subterranean formation;

hydraulically fracturing the subterranean formation with the fracturing fluid, wherein the fracturing fluid forms an emulsion with crude oil in the subterranean formation;

releasing the demulsifier from the capsules in the subterranean formation, wherein release of the demulsifier from the capsules is delayed based on at least one of type of encapsulating agent of the capsules, amount of the encapsulating agent, wall thickness of the capsules, or strength comprising crosslinking of the encapsulating agent;

breaking the emulsion in the subterranean formation with the demulsifier released by the capsules, wherein the friction reducer stabilizes the emulsion in the subterranean formation before the breaking of the emulsion with the demulsifier; and flowing the fracturing fluid as flowback from the subterranean formation through the wellbore to surface after breaking the emulsion, wherein the flowback as reaching the surface from the subterranean formation through the wellbore is not emulsified.

2. The method of claim 1, wherein the capsules are formed by encapsulating the demulsifier via at least one of coacervation, spray drying, or freeze drying, and wherein the capsules comprise a particle size in a range of 50 nanometers to 2 millimeters.

3. The method of claim 1, wherein flowing the fracturing fluid as flowback comprises flowing the fracturing fluid as flowback from the subterranean formation through the wellbore to the surface during the breaking of the emulsion.

4. The method of claim 3, wherein the breaking of the emulsion comprises breaking the emulsion in the wellbore with the demulsifier released by the capsules.

5. The method of claim 1, wherein the breaking of the emulsion with the demulsifier occurs in the subterranean formation, and wherein the breaking of the emulsion with the demulsifier occurs in the wellbore as the fracturing fluid flows as the flowback through the wellbore to the surface.

6. The method of claim 1, wherein the providing the fracturing fluid comprises pumping the fracturing fluid through the wellbore into the subterranean formation, wherein flowing the fracturing fluid as the flowback from the subterranean formation through the wellbore to the surface does not occur until after the breaking the emulsion, and wherein the capsules comprise microcapsules.

7. The method of claim 1, wherein the capsules are formed by encapsulating the demulsifier via coacervation, and wherein the fracturing fluid comprises the capsules in a range of 0.001% to 1%, by weight or volume.

8. The method of claim 1, wherein the friction reducer comprises a polymer, wherein the fracturing fluid comprises a friction reducer breaker that breaks polymer chains of the friction reducer, and wherein the fracturing fluid comprises proppant for at least a portion of the providing of the fracturing fluid.

9. The method of claim 1, wherein the providing the fracturing fluid comprises flowing the fracturing fluid through the wellbore into the subterranean formation, wherein enclosed material including the demulsifier in the capsules is a core, an internal phase, and/or a fill of the capsules, wherein a wall of the capsules is a shell, a coating, and/or a membrane of the capsules, wherein the wall has the wall thickness and comprises the encapsulating agent, and wherein the release of the demulsifier from the capsules is delayed until after the friction reducer has reduced friction of the flowing of the fracturing fluid through the wellbore into the subterranean formation.

10. The method of claim 8, wherein after breaking the friction reducer with the friction reducer breaker, residual polymer of the friction reducer stabilizes the emulsion, and wherein the release of the demulsifier from the capsules is delayed until after the hydraulically fracturing of the subterranean formation with the fracturing fluid is complete.

11. The method of claim 1, wherein the encapsulating agent comprises ethyl cellulose, polyvinyl alcohol, gelatin, sodium alginate, and a hydrophilic colloid, and wherein the hydrophilic colloid comprises gelatin, albumen, alginate (e.g., sodium alginate), casein, agaragar, starch, pectins, carboxymethyl cellulose, Irish moss, or Arabic gum, or any combinations thereof, and wherein the demulsifier comprises a polygycol, a polyglycol ester, an ethoxylated alcohol, an ethoxylated amine, an ethoxylated resin, an ethoxylated phenol formaldehyde resin, an ethoxylated nonylphenol, a polyhydric alcohol, or a sulfonic acid salt, or any combinations thereof.

12. The method of claim 1, wherein the friction reducer promotes the fracturing fluid forming the emulsion with the crude oil in the subterranean formation.

13. The method of claim 1, wherein the fracturing fluid is slickwater.

14. The method of claim 1, wherein the fracturing fluid is a water-based fracturing fluid.

15. The method of claim 14, wherein the water-based fracturing fluid comprises a polymer-based fluid, a gel-based fluid, or a surfactant-based fluid, or any combinations thereof.

16. The method of claim 1, wherein the emulsion is an oil in water emulsion comprising an oil phase dispersed in an aqueous phase.

* * * * *